United States Patent
Lee et al.

(10) Patent No.: US 7,286,238 B2
(45) Date of Patent: Oct. 23, 2007

(54) FEATURE ISOLATION FOR FREQUENCY-SHIFTING INTERFEROMETRY

(75) Inventors: Christopher A. Lee, Pittsford, NY (US); Andrew Kulawiec, Fairport, NY (US); Mark J. Tronolone, Fairport, NY (US)

(73) Assignee: Corning Incorporated, Corning, NY (US)

( * ) Notice: Subject to any disclaimer, the term of this patent is extended or adjusted under 35 U.S.C. 154(b) by 314 days.

(21) Appl. No.: 10/946,693

(22) Filed: Sep. 22, 2004

(65) Prior Publication Data

US 2006/0061773 A1   Mar. 23, 2006

(51) Int. Cl.
    *G01B 9/02* (2006.01)
(52) U.S. Cl. .................. 356/489; 356/511; 356/516
(58) Field of Classification Search ................ 356/489, 356/511–513, 516
    See application file for complete search history.

(56) References Cited

U.S. PATENT DOCUMENTS

| | | | |
|---|---|---|---|
| 5,481,360 A | * | 1/1996 | Fujita .......................... 356/489 |
| 5,872,629 A | * | 2/1999 | Colvard ....................... 356/487 |
| 6,690,690 B2 | | 2/2004 | Marron ......................... 372/20 |
| 6,741,361 B2 | | 5/2004 | Marron ......................... 356/512 |
| 6,882,432 B2 | | 4/2005 | Deck ........................... 356/512 |
| 6,924,898 B2 | | 8/2005 | Deck ........................... 356/512 |

* cited by examiner

*Primary Examiner*—Tarifur Chowdhury
*Assistant Examiner*—Jonathon D Cook
(74) *Attorney, Agent, or Firm*—Timothy Schaeberle

(57) ABSTRACT

Frequency-scanning interferometry is used for measuring test objects having multiple surface regions. The regions are distinguished and can be measured based on different measuring criteria. Interference data is gathered for the imageable portion of the test object from a plurality of interference patterns taken over substantially the same imageable portion at different measuring beam frequencies. The interference data is evaluated to determine topographical measures of associated points on the test object. The topographical measures are compared against a benchmark to distinguish between points on the test object that are within a first of the surface regions from points on a boundary separating the first surface region from one or more other surface regions of the imageable portion of the test object. The interference data of points within the first surface region are further evaluated to a higher accuracy.

20 Claims, 3 Drawing Sheets

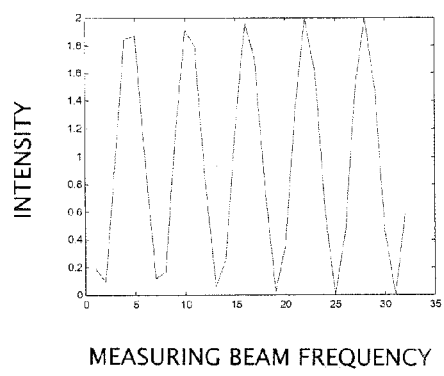
FIG. 5A
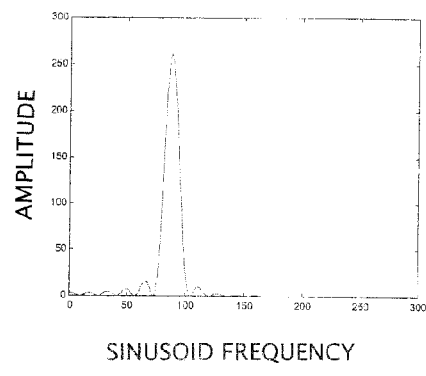
FIG. 5B
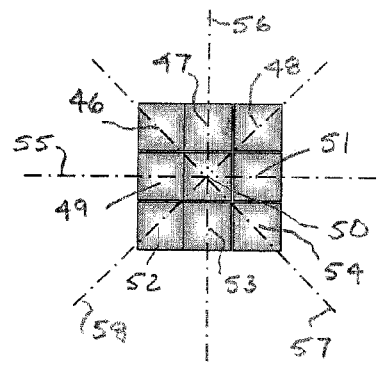
FIG. 6
FIG. 7
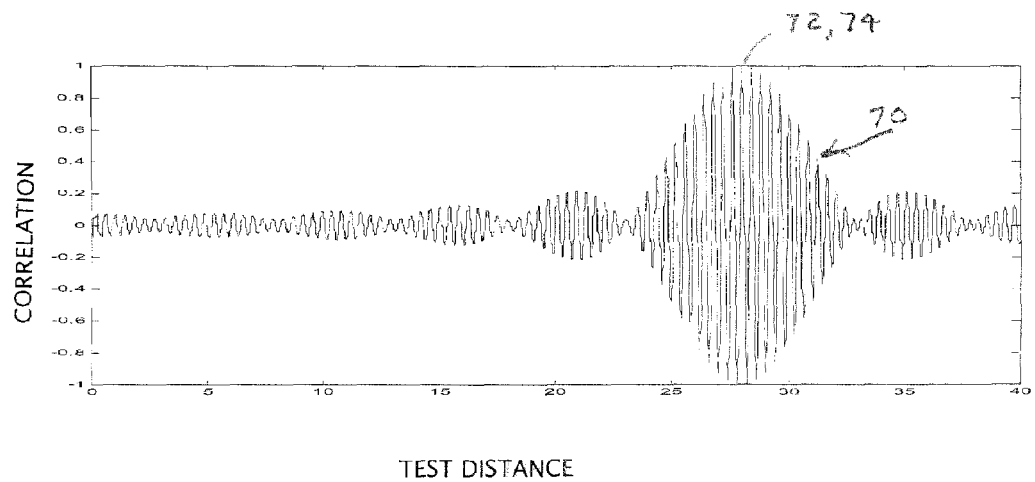
TEST DISTANCE

FEATURE ISOLATION FOR FREQUENCY-SHIFTING INTERFEROMETRY

BACKGROUND OF THE INVENTION

1. Field of the Invention

The invention relates to the measurement of surface features of test objects using frequency-shifting interferometry, and in particular to such measurement of test objects having distinguishable surface regions that may be subject to differing measuring requirements.

2. Description of Related Art

Frequency-shifting interferometry, which involves the collection of interference data at multiple measuring beam frequencies for converting the accompanying variations in intensity into a measure of optical path length difference between interfering portions of the measuring beam, is noted for the capability of taking measurements over a wider range of distances than conventional phase-shifting interferometry. For example, test surfaces having discontinuities well beyond the measuring beam wavelength can be unambiguously measured using frequency-shifting interferometry.

However, considerable pixel-by-pixel processing is required to complete the measurement of test surfaces over which frequency-shifting interference data is gathered. Each pixel collects light from a finite area of the test surface, and separate calculations are carried out for each pixel of recorded interference data for measuring local height variations of the test surface (i.e., surface topographies). The calculations convert the intensity data collected for each pixel at the multiple measuring beam frequencies into a measure of surface topography, and the calculations for each pixel take time.

U.S. Pat. No. 6,741,361 entitled MULTI-STAGE DATA PROCESSING FOR FREQUENCY-SCANNING INTERFEROMETER discloses examples of the pixel-by-pixel processing in multiple stages. Increased accuracy is achieved by additional stages of processing. Although the disclosed multi-stage processing saves time, the additional processing for achieving increased accuracy takes more time than measurements of lesser accuracy.

Co-assigned U.S. application entitled PHASE-RESOLVED MEASUREMENT FOR FREQUENCY-SHIFTING INTERFEROMETER, filed on even date herewith, discloses further improved processing procedures for achieving high accuracies typical of conventional phase-shifting interferometers over a range of measurement typical of phase-shifting interferometers or beyond. Each pixel is calculated separately based on intensity measurements acquired at multiple measuring beam frequencies.

Computer processing time associated with the measurement of surface topographies, particularly when higher accuracies are required, can add considerably to the overall time required to measure the surfaces. The time for taking measurements is particularly important in the manufacturing environment where expensive operations can be slowed by the measurements. To avoid production down time, inspection criteria can be lowered, fewer test objects can be inspected, or less satisfactory inspection techniques can be applied.

The surfaces of some test objects have different regions over which different measuring criteria can be applied. For example, some regions of test surfaces can require measurement to higher accuracy than other regions of the same test surfaces, including different regions imaged by the same interference patterns. Generally, the interference patterns are evaluated as a whole or within more limited areas that are within a range of measurement.

Frequency-shifting interferometers are capable of measuring rougher surfaces and surfaces with larger discontinuities than conventional phase-shifting interferometers, including surfaces with regular variations that exceed one fringe spacing (e.g., one-half of the measuring beam wavelength). The interference patterns evaluated by frequency-shifting interferometers are often apparent as speckle patterns having no discernable fringes and extending largely without interruption over a wide range of surface variations.

BRIEF SUMMARY OF THE INVENTION

The invention is directed in part to conserving processing time of frequency-shifting interferometers for enhancing measuring speed or efficiency. Particular benefits can be derived for measuring imageable test surfaces having regions that are subject to different measuring criteria such as manufacturing tolerances. Generally, the surface regions subject to different measuring criteria are separated from each other by distinct surface discontinuities, including abrupt changes in surface height or slope. The invention in one or more of its preferred embodiments provides for (a) evaluating interference data to identify such discontinuities as the boundaries of the different regions and (b) adjusting processing requirements for evaluating the remaining interference data depending upon the measuring criteria of the different regions. The invention also provides for distinguishing between regions for making relational measurements.

Regions of test surfaces subject to higher accuracy requirements can be identified and measured to required accuracy to the exclusion of other regions of the test surfaces subject to lower accuracy requirements or not requiring measurement at all. Two or more distinct regions of an imageable test surface can be measured to different accuracies, or two or more offset regions of an imageable test surface can be measured to the same accuracy. New procedures, which can be followed in accordance with the invention, avoid wasting time taking measurements beyond required accuracies and support faster overall measuring times. Dust particles and other surface contaminants, as well as test surface mounting elements, can be identified and excluded from the measurements.

One embodiment of the invention as a method of measuring test objects having multiple surface regions illuminates and gathers interference data for the imageable portion of a test object from a plurality of interference patterns taken over substantially the same imageable portion at different measuring beam frequencies. The interference data is considered in sets of corresponding pixels within the interference patterns associated with points on the test object. The interference data sets are evaluated to determine topographical measures of associated points on the test object. The topographical measures are compared against a benchmark (e.g., a threshold) to distinguish between points on the test object that are within a first of the surface regions from points on a boundary separating the first surface region from one or more other surface regions of the imageable portion of the test object.

Preferably, a point on the test object known to be within the first surface region is chosen as a starting point for the comparison, and the topographical measures of a sequence of neighboring points are compared against the benchmark to identify a contiguous set of points distinguished from the boundary. The topographical measures can include measures of surface height among the points on the test object, and the benchmark can be related to an amount of height variation. Alternatively, the topographical measures can include measures of local gradients among the points on the test object, and the benchmark can be related to an amount of slope.

Two or more of the plurality of surface regions can be subject to different measurement criteria. For example, the interference data sets can be arranged to determine the topographical measures of the associated points on the test object to a first accuracy. Additional processing can be used to further evaluate the interference data sets of points within the first surface region to determine topographical measures of the points within the first surface region to a second higher accuracy.

A comparison of the topographical measures against the benchmark can also be used to distinguish between points on the test object that are within a second of the surface regions from points on a boundary separating the second surface region from one or more other surface regions of the imageable portion of the test object. Measurement ambiguities can be resolved by additional input or processing to relate the topographical data of the points within the first surface region to the topographical data of the points within the second surface region.

Another embodiment of the invention as a method of measuring a test object having surface regions subject to different measurement criteria produces a plurality of interference patterns covering at least two surface regions of the test object at a succession of different measuring beam frequencies. Interference data from the plurality of interference patterns is converted into topographical measures of points within the two surface regions. The topographical measures are compared to distinguish points within a first of the two surface regions from points within a second of the two surface regions. The interference data of points within the first surface region is converted into topographical measures of a higher accuracy for evaluating the points within the first surface region to a different measurement criterion than the points within the second surface region.

The interference data from both the first and second surface regions is preferably converted into topographical measures by determining a rate of phase change of the interference data as a function of changes in the measuring beam frequency. The interference data from the first surface region is preferably converted into topographical measures of higher accuracy by determining a phase offset of the points. The phase offsets can be used to resolve the topographical measures into variations in surface height to accuracies of less than one-half wavelength of the measuring beam.

Another embodiment of the invention as method of measuring a particular surface region of a test object using a frequency-shifting interferometer produces interference patterns at different measuring beam frequencies imaging a plurality of surface regions of a test object including a first surface region intended for measurement. Interference data is gathered from the interference patterns in sets for individual points on the test object. A first point on the test object known to be within the first surface region is chosen as a starting point for identifying other points within the first surface region. The interference data sets are evaluated to determine topographical measures of the individual points on the test object. The topographical measures of a sequence of neighboring points starting adjacent to the first point are compared against a benchmark to identify the first surface region as a contiguous set of points distinguished from a boundary.

For making the comparisons, the interference data sets of points within more than the first of the surface regions of the test object can be evaluated. However, the interference data sets of points within the first surface region is preferably further evaluated to determine topographical measures of the points within the first surface region to a higher accuracy.

Either all of the interference data sets can be evaluated prior to making the comparisons or the results of the comparisons can be used to affect the order at which the interference data is evaluated. For example, the steps of evaluating and comparing can be alternated for sequentially evaluating the neighboring points intended for comparison based on the results of the comparison for identifying other neighboring points.

The procedures for distinguishing a first surface region from a boundary can also be used to exclude boundaries or other regions defined by boundaries or to compare different regions. For example, mounting elements such as wires can be excluded from the measurement of test objects, or two or more regions can be identified, measured to required accuracy, and compared to each other.

BRIEF DESCRIPTION OF THE SEVERAL
VIEWS OF THE DRAWING(S)

FIG. 5A plots the intensity values of a typical pixel data set, showing the intensity values varying sinusoidally between conditions of constructive and destructive interference as the measuring beam frequency is incrementally varied.

FIG. 5B plots the amplitude of the tested frequency sinusoids matching the intensity values of the pixel data set of FIG. 5A.

FIG. 6 shows a portion of a pixel detector array featuring a single pixel surrounded by neighboring pixels for referencing measures of test surface slope.

FIG. 7 plots measures of correlation between the expected intensity patterns at a plurality of test distances $D_T$ for an actual distance D.

DETAILED DESCRIPTION OF THE
INVENTION

Figure 1:
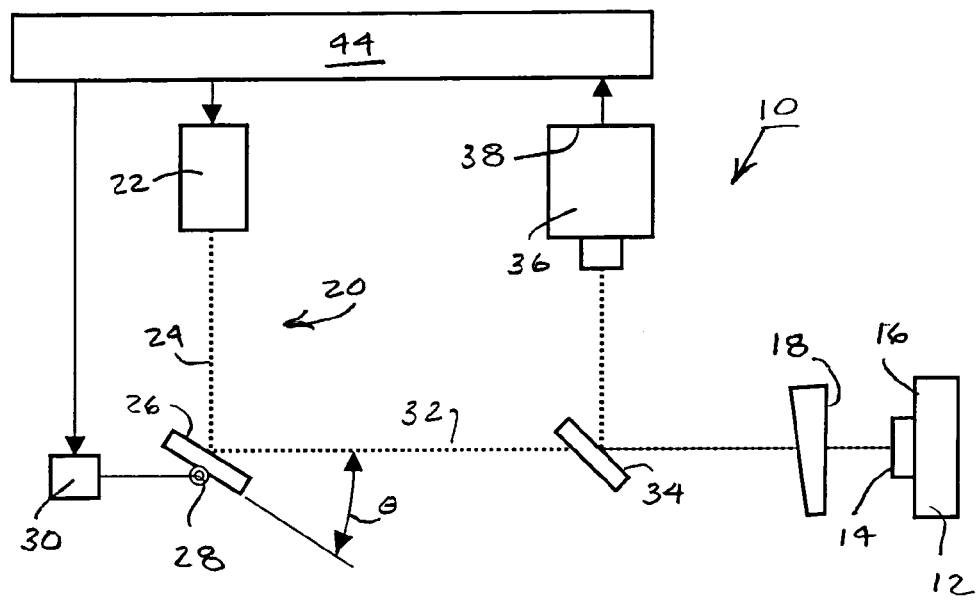
FIG. 1 is a diagram of a frequency-shifting interferometer arranged for measuring isolated surface regions of a test object.
Figure 2:
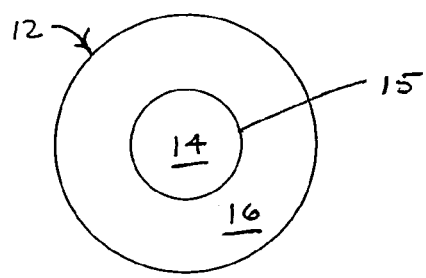
FIG. 2 is a plan view of a test object having multiple surface regions that can be subject to different measuring criteria.

A frequency-scanning interferometer 10 is shown in FIG. 1 in a common path (e.g., Fizeau) configuration for measuring a test object 12 having first and second surface regions 14 and 16 as also shown in FIG. 2. Height variations among points on one or both of the first and second test surface regions 14 or 16 are measured in comparison to a reference surface 18 by collecting and evaluating interference data for each of the points at a plurality of measuring beam frequencies. The second surface region 18 surrounds the first surface region 16, and a boundary 15 separates the two surface regions 14 and 16. In this example, the first surface region 14 is subject to more stringent measuring criteria, such as a more limited tolerance for height variation, than the second surface region 16 and requires measurement to higher accuracy.

A preferred coherent light source for the interferometer 10 is a mode-selective frequency-tunable laser 20, which includes a lasing cavity 22 and a feedback cavity 24. A frequency adjuster shown as an angularly adjustable diffraction grating 26 forms one end of the feedback cavity 24 and is adjustable about a pivot axis 28 as directed by a driver 30 through a range of angles θ for adjusting the beam frequency output of the frequency-tunable laser 20. The angularly adjustable diffraction grating 26 retroreflects light of a first diffraction order back into the lasing cavity 22 for influencing the lasing frequency subject to the least loss. Different frequencies are returned to the lasing cavity 22 as a function of the inclination angle θ of the diffraction grating 26.

For purposes of simplifying data processing operations of the frequency-shifting interferometer 10, particularly for making approximate topographical measures of one or both of the test surface regions 14 and 16, the diffraction grating 26 is pivoted between positions for selecting among nominal beam frequency modes favored by the lasing cavity 22 for varying the frequency output of the frequency-tunable laser 20 by one or more intervals of the mode spacing. Zero order reflections from the diffraction grating 26 reflect a measuring beam 32 in a different direction as the output of the frequency-tunable laser 20. A folding mirror (not shown) moves together with the diffraction grating 26 to maintain a single output direction for the measuring beam 32. Such folding mirrors are shown in U.S. Pat. No. 6,690,690, entitled TUNABLE LASER SYSTEM HAVING AN ADJUSTABLE EXTERNAL CAVITY, which is hereby incorporated by reference.

Additional details of such frequency-tunable lasers are given in co-assigned U.S. application entitled MODE-SELECTIVE FREQUENCY TUNING SYSTEM filed on even date herewith, which is hereby incorporated by reference. Other frequency tunable lasers can also be used in accordance with the invention including continuously tunable lasers, which can be arranged to output a plurality of discrete beam frequencies. A feedback system (not shown), such as described by co-assigned U.S. application entitled OPTICAL FEEDBACK FROM MODE SELECTIVE TUNER, filed on even date herewith and hereby incorporated by reference, can be used to further adjust the output of the frequency-tunable laser or to participate in the subsequent processing of interference data.

Figure 3:
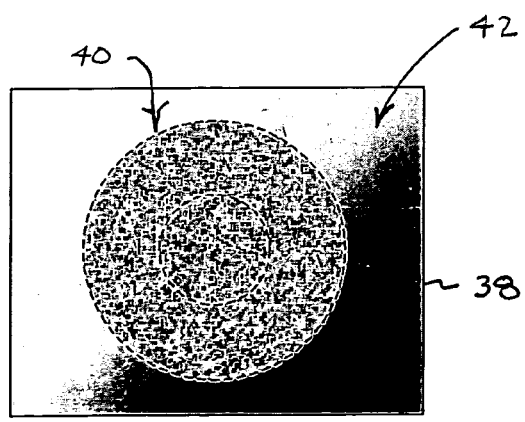
FIG. 3 shows the test object imaged onto a detector as an interference speckle pattern. Outlines of the test object are superimposed on the pattern.

The measuring beam 32 output by the frequency tunable laser 20 propagates along a common optical pathway to both the reference surface 18 and the pair of first and second surface regions 14 and 16 of the test object 12. One portion of the measuring beam 32 reflects from the reference surface 18 as a reference beam, and another portion of the measuring beam 32 transmits through the reference surface 18 and reflects from the first and second test surface regions 14 and 16 as an object beam. A beamsplitter 34, which allows for the passage of the measuring beam 32 to both the reference surface 18 and the first and second test surface regions 14 and 16, directs the returning reference and object beams to a camera 36 that records interference patterns between the reference and object beams as images of the test object 12. A separate interference pattern 40, as shown in FIG. 3, is recorded for each of the plurality of measuring beam frequencies emitted from the frequency tunable laser 20. The interference pattern 40 is depicted as a speckled interference pattern reflecting a surface roughness approaching one-half wavelength of the measuring beam or more.

Within an image plane 42 overlying a detector 38 (e.g., a charge-coupled diode array) of the camera 36, the interfering reference and object beams form the speckled interference pattern 40 as an image of the first and second test surface regions 14 and 16. A different speckled interference pattern is formed by each of the different measuring beam frequencies output by the frequency tunable laser 20. A computer 44 records the different interference patterns on a pixel-by-pixel basis as local measures of beam intensity referenced throughout the image plane 42 of the detector 38.

Figure 4:
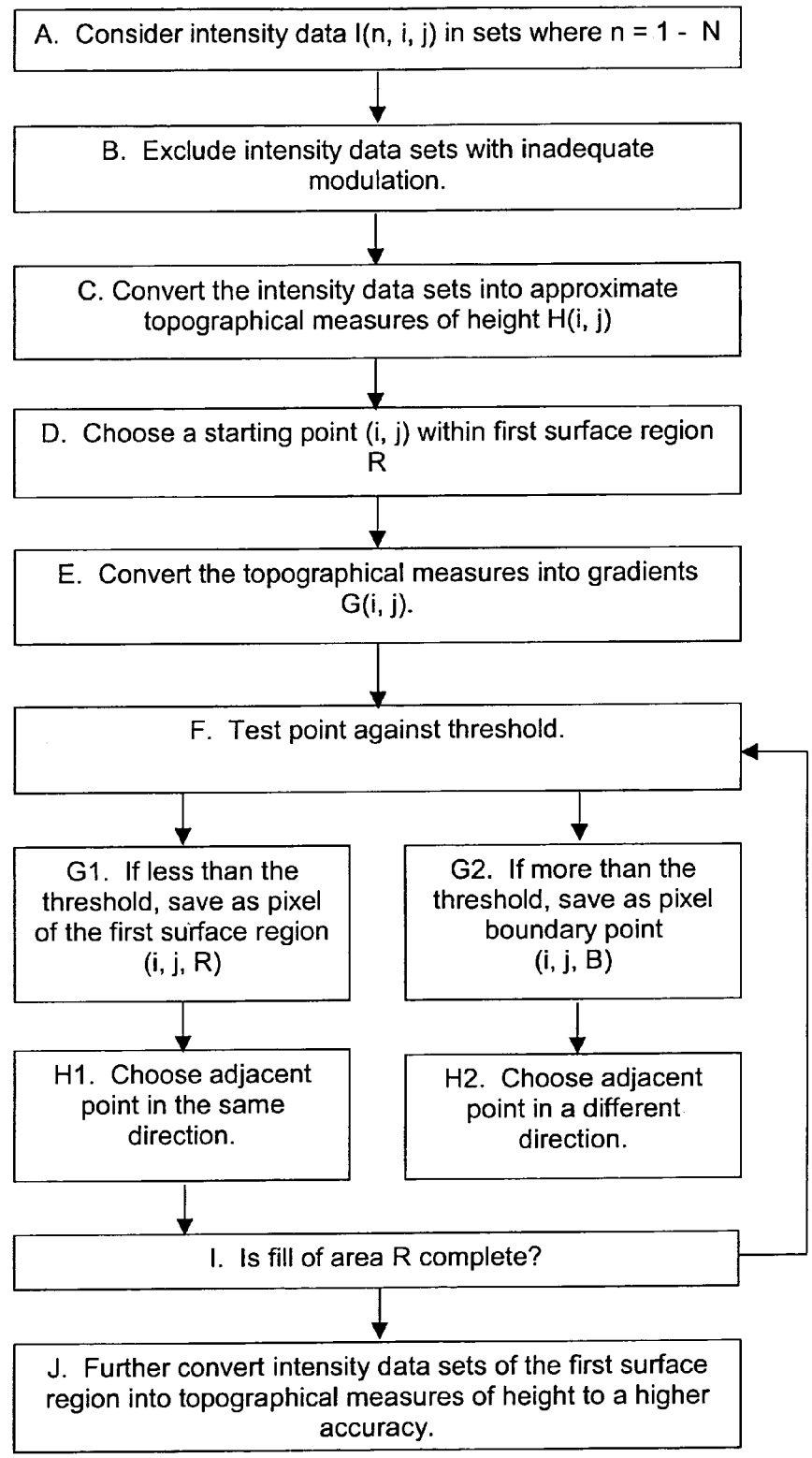
FIG. 4 is a flow chart showing the identification and further measurement of a limited surface region of the test object.

A list of exemplary computer processing steps for measuring the first test surface region 14 to a higher accuracy than the second test surface region 16 is contained in FIG. 4. In step A, intensity data I(i, j, n) for each pixel (i, j) of the camera array is gathered over the plurality of interference patterns (n=1 to N) as a separate set. Within each set, an individual pixel (i, j) is associated with N intensity values corresponding to the interference patterns produced at N different measuring beam frequencies. Step B excludes from further consideration pixel data sets with inadequate modulation as an indication that the excluded pixels are not part of an interference pattern.

Calculations performed in step C, such as Fourier transforms, convert the intensity data sets into approximate topographical measures H(i, j) of local test object height. Fourier transforms can be used to describe the intensity values of each set as a function of the regularly changing beam frequency in the form of a peak amplitude sinusoid, itself having a frequency that is directly related to the local height H(i, j) of the corresponding point on one of the test surface regions 14 or 16. Each different local height H(i, j) is associated with a unique rate of change in phase with respect to beam frequency, which is evident as the frequency of the peak amplitude sinusoid or as an alias thereof. Weighted averaging, such as a conventional moment arm technique, or other interpolation techniques, can be used to locate the peak amplitude sinusoid among the higher amplitude sinusoids tested by the function.

The intensity value I(i, j, n) for a pixel in the detector array 38 can be written as the interference of the reference beam $U_{REF}$ and the object beam $U_{TEST}$ as follows:

$$I(i, j, n) = |(U_{REF} + U_{TEST})|^2. \quad (1)$$

The reference beam $U_{REF}$ can further be written as:

$$U_{REF} = \sqrt{I_{REF}} \exp\left(i\frac{4\pi}{c} D_{REF} v\right), \quad (2)$$

where $I_{REF}$ is the intensity of the reference beam, c is the speed of light, $D_{REF}$ is the optical distance from the laser source 20 to the detector array 38 via the reference surface 18, and v is the laser frequency.

Similarly, the object beam $U_{TEST}$ is given by:

$$U_{TEST} = \sqrt{I_{TEST}} \exp\left(i\frac{4\pi}{c} D_{TEST} v\right). \quad (3)$$

where $I_{TEST}$ is the intensity of the object beam and $D_{TEST}$ is the optical distance from the laser source 20 to the detector array 38 via one of the test surface regions 14 or 16.

By substitution into Equation (1) we then have:

$$I(i, j, n) = I_{REF} + I_{TEST} + 2\sqrt{I_{REF} I_{TEST}} \cos\left(\frac{4\pi}{c} Dv\right), \quad (4)$$

where distance $D = D_{REF} - D_{TEST}$. Since the test and reference beam components are reflected, the distance D is equal to one-half of the optical path length difference of light travel between the reference surface 18 and one or the other of the test surface regions 14 or 16.

Equation (4) forms the basis for measurement using a frequency-shifting interferometer, such as the interferometer 10. The basic task is to determine the value of distance D that gives rise to the series of intensity measurements at the sampled measuring beam frequencies. The local heights H(i, j) correspond to variations in the distance D from a given reference distance, such as the average distance between the reference surface 18 and the test surface regions 14 and 16.

In a simplified discrete notation of Equation (4), an intensity I'(i, j, n) with bias subtracted and magnitude normalized to one is given as follows:

$$I'(i, j, n) = \cos\left(\frac{4\pi}{c} D v_n\right), \quad (5)$$

where I'(i, j, n) is the normalized intensity value at a pixel (i, j) recorded at the $n^{th}$ measuring beam frequency and $v_n$ is the $n^{th}$ measuring beam frequency value.

A discrete Fourier transform for assessing the frequency components of a set I'(n) of the normalized intensity values for a given pixel (i, j) is given as follows:

$$K'(m) = \sum_{n=1}^{N} I'(n) \exp[-i 2\pi (n-1)(m-1)/M], \quad (6)$$

where M is the total number of frequency component samples distributed evenly throughout Fourier frequency space, m denotes one of the frequency components ordered from 1 to M throughout the Fourier frequency space, and K'(m) measures how well each of the m ordered individual frequency components samples (also referred to as bins) matches the interference frequency of the recorded data point intensities I'(n) of each pixel (i, j).

FIG. 5A plots the intensity values I'(n) of a typical pixel data set, showing the intensity values varying sinusoidally between conditions of constructive and destructive interference as the measuring beam frequency is incrementally varied. FIG. 5B shows the results of a Fourier transform for identifying the frequency of the sinusoid that best matches the intensity values. The Fourier transform treats the intensity values I'(n) as phases of a sinusoid, and the rate of change of phase as a function of beam frequency (i.e., the frequency of the sinusoid) is a measure of the distance D as follows:

$$D = 2 c f_m, \quad (7)$$

where c is the speed of light and $f_m$ is the frequency of the highest amplitude sinusoid of the Fourier transform as follows:

$$f_m = \frac{\Delta \theta}{2\pi \Delta v}, \quad (8)$$

where $\Delta\theta$ is the change in phase and $\Delta v$ the change in beam frequency.

Examples of such processing can be found in U.S. Pat. No. 6,741,361 entitled MULTI-STAGE DATA PROCESSING FOR FREQUENCY-SCANNING INTERFEROMETER, which is hereby incorporated by reference. Although the intensity patterns from unevenly spaced measuring beam frequencies can also be transformed into measures of the distance D, the calculation of approximate local heights H(i, j) of the test object 12 from each set of a single pixel's data can be simplified by generating the different interference patterns at equally spaced beam frequency intervals and finding the peak amplitude sinusoid using a Fast Fourier Transform (FFT).

The first and second surface regions 14 and 16 can be distinguished from one another in a number of ways including by sorting the local height values H(i, j) between different ranges of height associated with the two surface regions 14 and 16. However, if the first and second surface regions 14 and 16 are offset from each other beyond an ambiguity interval within which the heights can be uniquely defined (e.g., limited as a result of aliasing), then other approaches must be used, such as by distinguishing values within the first surface region 14 from values on its boundary 15. The latter approach involves comparing the calculated topographical values, such as height or slope against a threshold value or other benchmark.

Step D initiates such a comparative approach by choosing a starting point (i, j) within the first surface region 14. For example, the imaged test object 12 can be imaged onto a computer screen to allow an operator to choose the starting point, or prior knowledge of the test object 12 can be used to make an automatic selection of a starting point. The pixel height values H(i, j) are converted by step E into gradients G(i, j,) having slope components in each of four planar orientations of surrounding pixels.

FIG. 6 shows a single pixel 50 surrounded by neighboring pixels 46 through 49 and 51 through 54. Four planes 55, 56, 57, and 58 reference the directions in which the slope components are measured. In step F, the slope components are compared to a slope threshold (e.g., one micron per pixel) corresponding to a given maximum change in height H(i, j) over the pixel interval. The threshold is preferably chosen based on the expected characteristics of the test object 12, including surface roughness and form.

Two outcomes are possible, referenced as steps G1 and G2. If the calculated slope for a pixel (i, j) is less than or equal to the threshold, the pixel (i, j) is identified as a pixel of the first surface region (i, j, R). If the calculated slope for a pixel (i, j) is more than the threshold, the pixel (i, j) is identified as a pixel of the first surface region's boundary (i, j, B). Step H1 follows step G1 and selects an adjacent pixel in the same direction for testing against the threshold. Step H2 follows step G2 and selects an adjacent pixel in a different direction for testing against the threshold. Conventional fill techniques can be used to select among the remaining pixels for testing against the threshold to identify the pixels that correspond to the test surface region 14.

Step I queries if the current region R is filled. If substantially all of the pixels within the boundary 15 have been identified, processing proceeds to Step J. Otherwise, processing returns to step F to continue making threshold comparisons for more pixels. At step J, the interferometric data gathered for the pixels (i, j, R) within the first surface region 14 are further evaluated to a higher accuracy. For example, the approximate measures of the test object heights H(i, j) can be used to perform a finer Fourier transform of the normalized intensity data I'(i, j, n) in the vicinity of the first approximation. Alternatively, correlation techniques can be used to more closely fit a sinusoid to the normalized intensity data I'(i, j, n).

For example, the measurement of distance D can be accomplished by determining the value of $D_T$ that results in the best match between modeled data and the measured data. For a least-squares formulation, the following metric can be used to evaluate the match:

$$\varepsilon(D_T) = \sum_{n=1}^{N} \left[ I'(n) - \cos\left(\frac{4\pi}{c} D_T v_n\right) \right]^2 \qquad (9)$$

where $\varepsilon(D_T)$ is the value of the error metric at a trial distance $D_T$.

Following the least squares method, the error is minimized at a location where the derivative of $\varepsilon$ with respect to DT is equal to zero. The derivative is $$\frac{\partial \varepsilon(D_T)}{\partial D_T} = -\sum_{n=1}^{N} \frac{8\pi v_n}{c} I_n \sin\left(\frac{4\pi}{c} D_T v_n\right) + \sum_{n=1}^{N} \frac{4\pi v_n}{c} \sin\left(\frac{8\pi}{c} D_T v_n\right). \qquad (10)$$

Because the last term does not depend on the data, we can ignore it, leading to the following metric:

$$\varepsilon'(D_T) = \sum_{n=1}^{N} v_n I_n \sin\left(\frac{4\pi}{c} D_T v_n\right). \qquad (11)$$

To further simplify Equation (11), it may be noted that in the optical frequency regime (i.e., more than 300,000 GHz), the values of $v_n$ vary only slightly over the typical tuning bandwidth, and thus, the $v_n$ term immediately to the right of the summation can be ignored.

By finding the value of $D_T$ that minimizes $\varepsilon$ in Equation (11), a solution for $D_T$ can be obtained that matches both the phase offset and the frequency of phase change with the measuring beam frequency. The approach also allows for variation in the sampling of measuring beam frequencies, including unequally spaced frequency samples. So long as the values of $v_n$ are known, the values can be distributed as desired for achieving specific goals, including accuracy, repeatability, time, and cost.

Equation (11) also shows that other metrics are possible. For example, rather than minimizing the sine transform, one could maximize the cosine transform as follows:

$$\varepsilon''(D_T) = \sum_{n=1}^{N} I_n \cos\left(\frac{4\pi}{c} D_T v_n\right), \qquad (12)$$

which is equivalent to the real part of a Fourier transform.

Implementation of the least-squares method is straightforward. Given a vector of data values, as in Equation (8), and a vector of frequency values, a pre-computed 'matrix of sinusoids' can be constructed for testing to determine the value of $D_T$ that maximizes Equation (12).

Normalization can be used to remove unwanted bias from the merit function of Equation (12). The normalized merit function has a value of one when the intensity values correspond perfectly to the cosine term in Equation (12). The normalized merit function is given by:

$$E(D_T) = \frac{\sum_{n=1}^{N} I_n \cos\left(\frac{4\pi}{c} D_T v_n\right)}{\sqrt{\sum_{n=1}^{N} I_n^2} \sqrt{\sum_{n=1}^{N} \cos^2\left(\frac{4\pi}{c} D_T v_n\right)}}. \qquad (13)$$

An important practical aspect of implementing this algorithm is that the merit function in Equation (13) has fine detail on the order of the wavelength. For example, the phase offsets corresponding to the actual distance D and to other values of $D_T$ spaced by intervals of one-half the nominal wavelength of the measuring beam exhibit localized correlation peaks, which can be readily identified.

An exemplary plot of correlation as a function of test distance $D_T$ for an actual distance D of 28 microns is shown in FIG. 7. Within the main lobe or envelope 70, the merit function has many sharp localized peaks (approximately 12) separated by one-half of the nominal wavelength of the measuring beam (e.g., approximately 0.4 microns). The highest localized peak 72 corresponds to the generalized peak 74 of the main lobe 70 of the merit function at the test distance $D_T$ equal to 28 microns.

Using the correlation merit function of Equation (13), distances D can be determined on a pixel-by-pixel basis without regard to the distances of adjacent pixels. The test values $D_T$ are systematically varied until a localized peak correlation is found with the normalized data acquired from an individual pixel (i, j). Once a localized correlation peak is found, the number of remaining choices of $D_T$ for achieving a higher correlation is limited largely to multiples of one-half of the nominal measuring beam wavelength. Accordingly, convergence to the generalized peak 74 (where the frequency of phase change, i.e., the slope of the measured distance D, is also matched) is informed by the phase-offset requirements of the correlation, which contribute to both the speed and accuracy of the convergence.

In a sense, the identification of a localized peak is equivalent to phase shifting. Instead of collecting data at a fixed measuring beam frequency over a small range of distances to collectively reference pixel intensity values to their corresponding phases, data is collected at a fixed distance over a range of measuring beam frequencies to collectively reference pixel intensity values to their corresponding phases. However, unlike conventional phase shifting, the same correlation function that is used for identifying the phase offset can also be used for choosing among distances $D_T$ exhibiting the same phase offset for determining the distance D at which the pixel within the first test surface region 14 is located relative to a reference surface 18. More detailed processing procedures for achieving higher measurement accuracies are disclosed in co-assigned U.S. application entitled PHASE-RESOLVED MEASURE- MENT FOR FREQUENCY-SHIFTING INTERFEROMETER, filed on even date herewith and hereby incorporated by reference.

For satisfying other measuring criteria, the test surface region 16 could be similarly identified and more finely measured. Comparisons can also be made between the test surface regions 14 and 16, such as for parallelism and offset. For example, the test surface region 16 can be defined by the remaining interference pattern beyond the boundary 15 and similarly measured on a pixel-by-pixel basis similar to the test surface region 14. The two measured surfaces can then be compared based on desired relational criteria. Two or more test surface regions can be individually distinguished from other surface regions of more complex test objects in similar ways. For example, the above-described steps for identifying the boundary 15 can be used to identify one or more additional boundaries for identifying contiguous groups of pixels distinguished by the boundaries.

Although the invention has been described with respect to particular embodiments, the invention can be embodied in a variety of other ways as more generally taught. For example, the invention can be practiced using two arm interferometers, including Michelson and Mach-Zehnder configurations, arranged for performing frequency-shifting interferometry. Test surface regions can be distinguished in a variety of ways, including by using computer vision applications for edge finding independent of interferometry.

Instead of performing calculations for approximately measuring points throughout the interference patterns in advance of comparing the results against a threshold or other benchmark, the pixel points can be calculated individually as needed for making the comparisons to the benchmark. The topographical values represented by the pixel intensity patterns can be determined in the order that the pixels are compared the benchmark. The topographical calculations can be performed alternately with the pixel-to-threshold comparisons. Once a comparison is made, the topographical value of the next pixel in line for comparison is calculated. Preferably, only pixels within the surface region of interest and its boundary are measured. Each such calculation can be made to the final accuracy, or the comparisons can still be made based on approximate topographical values and more accurate measurements can be made without interruption for the pixels identified as being within the surface region of interest.

The invention claimed is:

1. A method of measuring test objects having multiple surface regions comprising steps of:
   illuminating an imageable portion of a test object having a plurality of surface regions separated from each other by distinct surface discontinuities;
   gathering interference data for the imageable portion of the test object from a plurality of interference patterns taken over substantially the same imageable portion at different measuring beam frequencies;
   considering the interference data in sets of corresponding pixels within the interference patterns associated with points on the test object;
   evaluating the interference data sets to determine a topographical measures of associated points on the test object to a first accuracy;
   comparing the topographical measures against a benchmark to distinguish between points on the test object that are within a first of the surface regions from points on a boundary separating the first surface region from one or more other surface regions of the imageable portion of the test object; and
   further evaluating the interference data sets of points within the first surface region to determine topographical measures of the points within the first surface region to a second higher accuracy than the points within the other surface regions.

2. The method of claim 1 in which the step of comparing includes choosing a point on the test object known to be within the first surface region as a starting point for the comparison and comparing the topographical measures of a sequence of neighboring points against the benchmark to identify a contiguous set of points distinguished from the boundary.

3. The method of claim 1 in which the topographical measures include measures of surface height among the points on the test object, and the benchmark is related to an amount of height variation.

4. The method of claim 1 in which the topographical measures include measures of local gradients among the points on the test object, and the benchmark is related to an amount of slope.

5. The method of claim 1 in which the step of comparing includes comparing the topographical measures against a benchmark to distinguish between points on the test object that are within a second of the surface regions from points on a boundary separating the second surface region from one or more other surface regions of the imageable portion of the test object.

6. The method of claim 5 including a step of relating the topographical data of the points within the first surface region to the topographical data of the points within the second surface region.

7. A method of measuring a test object having surface regions subject to different measurement criteria comprising steps of:
   producing a plurality of interference patterns at a succession of different measuring beam frequencies covering at least two surface regions of the test object separated from each other by distinct surface discontinuities;
   converting interference data from the plurality of interference patterns into topographical measures of points within the two surface regions;
   comparing the topographical measures to distinguish points within a first of the two surface regions from points within a second of the two surface regions; and
   further converting the interference data of points within the first surface region to topographical measures of a higher accuracy than the points within the second surface region for evaluating the points within the first surface region to a different measurement criterion than the points within the second surface region.

8. The method of claim 7 in which the step of converting the interference data includes evaluating the interference data as measures of phase change with respect to changes in the measuring beam frequency.

9. The method of claim 8 in which the step of further converting the interference data includes evaluating the interference data as measures of phase offset for measuring topographical variations in surface height to accuracies of less than one-half wavelength of the measuring beam.

10. The method of claim 7 in which points within the first surface region are identified by distinguishing a first set of contiguous points from a boundary that separates the first surface region from another of the surface regions.

11. The method of claim 10 in which the step of comparing includes comparing the topographical measures against a benchmark to distinguish between points on the test object that are within the first surface region from points on a boundary separating the first surface region from another of the surface regions.

12. The method of claim 11 in which the topographical measures include measures of surface height among the points on the test object, and the benchmark is related to an amount of height variation.

13. The method of claim 11 in which the topographical measures include measures of local gradients among the points on the test object, and the benchmark is related to an amount of slope.

14. The method of claim 11 in which the step of comparing includes choosing a point on the test object known to be within the first surface region as a starting point for the comparison and comparing the topographical measures of a sequence of neighboring points against the benchmark to identify a contiguous set of points distinguished from the boundary.

15. A method of measuring a particular surface region of a test object using a frequency-shifting interferometer comprising steps of:

producing interference patterns at different measuring beam frequencies imaging a plurality of surface regions of a test object including a first surface region intended for measurement;

gathering interference data from the interference patterns in sets for individual points on the test object;

choosing a first point on the test object known to be within the first surface region as a starting point for identifying other points within the first surface region;

evaluating the interference data sets to determine topographical measures of the individual points on the test object;

comparing the topographical measures of a sequence of neighboring points starting adjacent to the first point against a benchmark to identify the first surface region as a contiguous set of points distinguished from a boundary; and alternating the steps of evaluating and comparing by using the results of the comparisons to affect an order at which the interference data is evaluated.

16. The method of claim 15 including a step of further evaluating the interference data sets of points within the first surface region to determine topographical measures of the points within the first surface region to a higher accuracy.

17. The method of claim 16 in which the step of evaluating includes evaluating the interference data sets of points within more than one of the surface regions of the test object.

18. The method of claim 15 in which the topographical measures include measures of surface height among the points on the test object, and the benchmark is related to an amount of height variation.

19. The method of claim 15 in which the topographical measures include measures of local gradients among the points on the test object, and the benchmark is related to an amount of slope.

20. The method of claim 15 in which the step of evaluating includes evaluating neighboring points intended for comparison based on the results of the comparison for identifying other neighboring points.

* * * * *